INVENTOR.
Harry D. McClelland

Patented Jan. 12, 1943

2,308,191

UNITED STATES PATENT OFFICE 2,308,191

SCREEN DOOR HOOK

Harry D. McClelland, Topeka, Kans.

Application February 2, 1942, Serial No. 429,320

1 Claim. (Cl. 292—95)

My invention relates to door securing means and has among its objects and advantages the provision of an improved screen door hook mount.

Conventional screen door hook mounts constitute an eye secured to the door, with the hook pivotally connected with the eye. It frequently happens that the hook swings over the eye and is held in a position where the hook projects between the door and the door frame, so that slamming of the door causes the hook to mar the door frame as well as the door.

Accordingly, an object of my invention is to provide a screen door hook mount wherein the hook, upon being disengaged from the usual eye attached to the door frame, gravitates to a position which brings the hook out of the range of the door frame so as to preclude the hook from being caught between the door and the frame.

Figure 1:
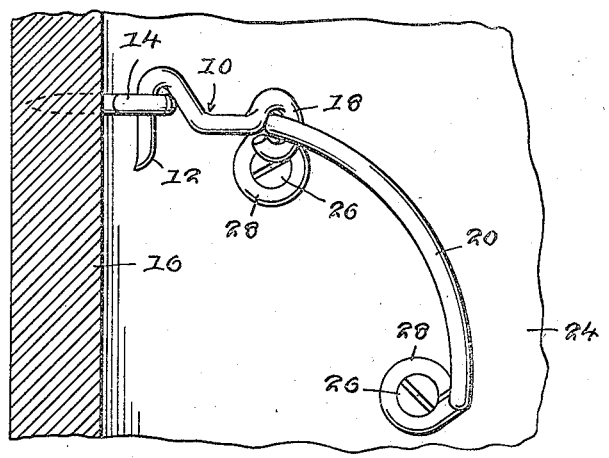
Figure 1 is a face view of a portion of a door illustrating the hook mount, with the hook connected with the eye secured to the door frame.

In the embodiment selected to illustrate my invention, I make use of a conventional hook 10 having a hook end 12 engageable with the eye 14 screwed into the door frame 16. The opposite end of the hook includes the usual eye 18, which eye is loosely mounted on a bar 20 having right angular extensions 22 fixedly secured to the door 24 through the medium of screws 26 extending through eyes 28 at the ends of the extensions 22.

Figure 2:
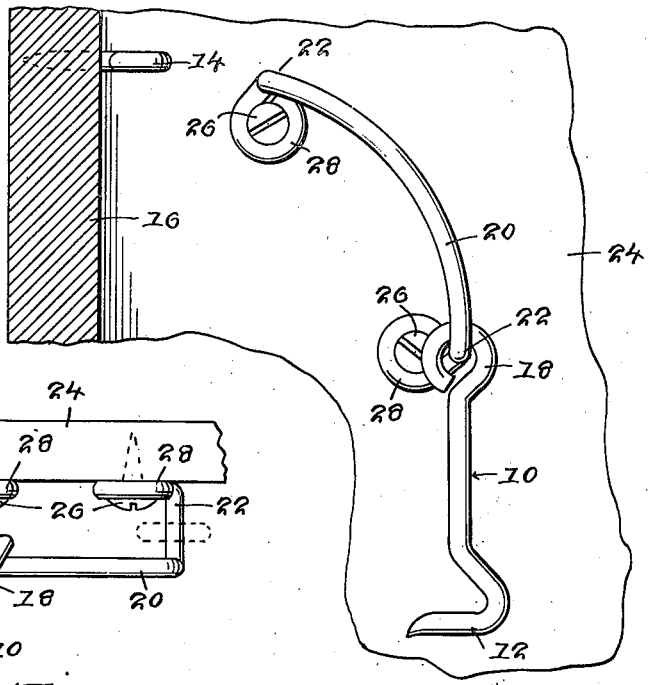
Figure 2 is a view similar to Figure 1 but illustrating the manner in which the hook shifts to a position removed from the door frame.
Figure 3:
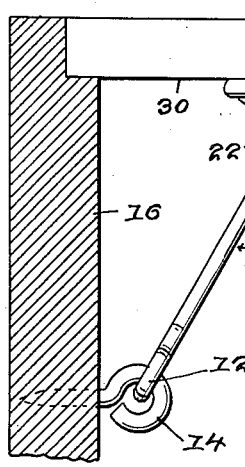
Figure 3 is a top plan view of the structure of Figure 1.

Figure 3 illustrates the bar 20 as being spaced some distance from the face 30 of the door, while Figures 1 and 2 illustrate the bar 20 as curving in the direction of the eye 14. Bar 20 is arranged substantially in an upright position but its curvature is such as to bring the eye 18 of the hook to a correct position with respect to the eye 14. Figure 3 illustrates the eye 18 located in the corner defined by one of the extensions 22 and the bar 20 when the hook end 12 is inserted through the eye 14.

When the hook 10 is disengaged from the eye 14, the hook is so positioned as to fall downwardly along the bar 20 when it is released. The lower end of the bar 20 is located at such a distance from the frame 16 as to prevent the hook from lodging in or swinging to a position between the door and the frame. The lower extension 22 constitutes a stop for the eye 18 as the hook gravitates to the lower end of the bar, while the bar 20 is so spaced from the door 24 as to provide ample clearance for free sliding movement of the hook 18 along the bar 20.

Without further elaboration, the foregoing will so fully illustrate my invention, that others may, by applying current knowledge, readily adapt the same for use under various conditions of service.

I claim:

The combination of a hook having an eye at one end and a formation at its other end engageable with an eye on a door frame, and a bar having lateral extensions at its ends provided with screw receiving openings to be secured to a door with the bar inclined to the vertical to position its lower end at a greater distance from the door frame than the upper end of the bar, said eye of the hook fitting loosely on said bar to cause the hook to gravitate downwardly and away from the door frame when the hook is disengaged from the eye on the door frame to bring the hook out of the range of the door frame, the lower extension on said bar supporting said hook in its lowermost position and the lateral extension at the upper end of said bar supporting said hook when the latter is engaged with the eye on the door frame.

HARRY D. McCLELLAND.